May 11, 1971 R. A. JANSSON ET AL 3,578,427
PROCESS FOR FABRICATING GLASS MULTIPLE GLAZED UNITS
Filed Dec. 16, 1968

INVENTORS
ROBERT A. JANSSON
RAYMOND J. MICKELIC

BY
Chisholm and Spencer
ATTORNEYS

United States Patent Office 3,578,427
Patented May 11, 1971

3,578,427
PROCESS FOR FABRICATING GLASS
MULTIPLE GLAZED UNITS
Robert A. Jansson, Pittsburgh, and Raymond J. Mickelic, Springdale, Pa., assignors to PPG Industries, Inc., Pittsburgh, Pa.
Filed Dec. 16, 1968, Ser. No. 784,130
Int. Cl. C03b 23/24
U.S. Cl. 65—58                                   10 Claims

ABSTRACT OF THE DISCLOSURE

A process for the manufacture of welded all-glass multiple glazed window units having a stepped edge configuration such that the spacing of the glass sheets about the marginal edges of the unit is less than the spacing of the glass sheets throughout the remainder of the unit. A multiple glazed unit is heated inwardly of the marginal fused edge of one of its glass sheets, and then the portion of the glass sheet within the heated circumscribing portion is moved relative to the other glass sheet.

BACKGROUND OF THE INVENTION

This invention relates to a process for fabricating all-glass multiple glazed window units and, more specifically, to a process for fabricating double-spaced multiple glazed window units having improved thermal insulating properties, yet units which are adapted to fit standard glazing sash for welded multiple glazed windows. In particular, the present invention relates to the fabrication of welded multiple glazed window units having a stepped edge configuration such that the spacing of the glass sheets about the marginal edges of the unit is less than the spacing of the glass sheets throughout the remainder of the unit.

Figure 1:
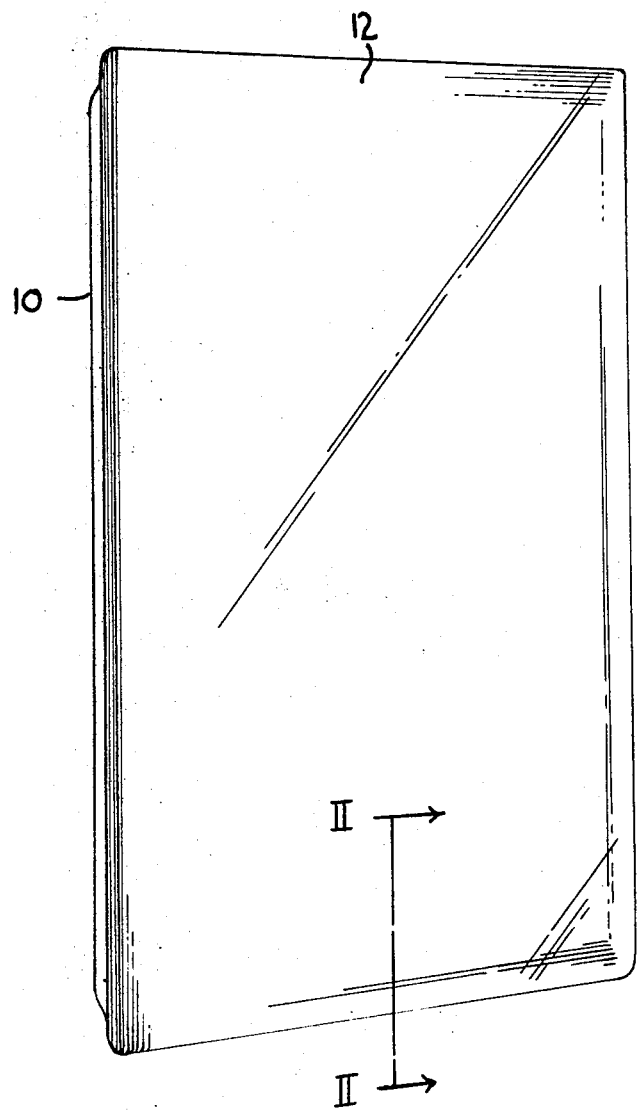
Figure 2:
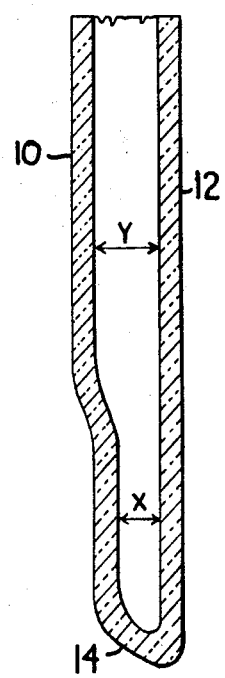

The foregoing and other objects, features and advantages of this invention will be better understood when reference is had to the accompanying drawing, in which:

FIG. 1 is a perspective view of a multiple glazed unit produced in accordance with this invention; and FIG. 2 is a typical cross-section along a line such as II—II of FIG. 1 showing the stepped edge configuration of the multiple glazed unit produced by this invention.

A typical process for making a welded multiple glazed window unit is disclosed in U.S. Pat. No. 2,624,979. This process comprises supporting two sheets of glass, with the upper sheet slightly larger than the lower sheet, in superimposed but slightly spaced relation to each other, heating the margins of the upper sheet until they droop and become welded or fused to the margins of the lower sheet, pulling the upper sheet upwardly to provide a chamber between the sheets, and abruptly increasing the air pressure within the unit to effect filleting of the welded connection between the sheets. The unit has a pore opening either in a face or an edge of the unit to allow for equalization of the pressure of the air within the unit with atmospheric pressure during subsequent annealing and cooling of the unit.

The heating of the edges of the glass is effected by localized electrical heating. In order to initiate the electrical heating operation, a stripe of an electrically conductive material, such as colloidal graphite, is applied to the upper sheet of glass near the edges of the sheet. The stripe extends continuously around the periphery of the sheet and may be on either the top or the bottom surface of the top sheet. This striping procedure may be carried out by the method taught by U.S. Pat. No. 2,999,036.

After the glass sheets are striped, they are placed one on top of the other upon a carriage and passed into a preheating furnace wherein the glass is heated to a temperature between 750° and 1000° F. It is necessary to preheat the glass sheets prior to the welding operation to prevent cracking of the glass during the initial stages of the welding. After the glass has been preheated, it is moved to a heated welding chamber, where the heated glass is removed from the carriage and placed in proper position for welding. This transferring may be accomplished by the method taught by U.S. Pat. 2,900,761 or 3,272,611, both of which teach the transferring of the pair of glass sheets without contacting the surfaces thereof which are to be the inside surfaces of the welded unit.

An electric current is then passed through the stripe to effect heating of the stripe and the glass immediately adjacent thereto. As the temperature of the glass rises in the vicinity of the stripe, the glass itself becomes a conductor, and the electrical heating can be continued in the glass even after the electrically conductive stripe has been burned away. In the welding process, the glass sheets are preferably supported in the manner disclosed in U.S. Pat. 3,268,316, and the edges of the glass sheets are electrically heated by cycling an electric current about the marginal edges of the upper glass sheet under automatic control, such as disclosed in U.S. Pats. Nos. 2,389,360 and 2,394,051, until the sheets have become welded.

In accordance with the present invention, welded multiple glazed units produced by the above process or other processes, such as the process disclosed in U.S. Pat. No. 3,257,187, may thereafter be further treated to produce a unit having greatly enhanced thermal insulating properties, yet a unit adapted for standard glazing in the rabbets or glazing channels provided by sash and framing manufacturers for conventional welded multiple glazed window units. In the practice of this invention, a unit of the type described above, i.e., a unit comprised of substantially uniformly-spaced glass sheets welded or fused at their marginal edges, has a continuous stripe of electrically conductive material, e.g., colloidal graphite, applied ½ inch to 1 inch in from the edges of the multiple glazed unit on the upper sheet of glass. The multiple glazed unit is then preheated for a time sufficient to elevate the glass temperature to about 700° to 900° F.

Thereafter, the unit is transferred into a chamber maintained at an ambient temperature of about 800° to 850° F. In this chamber, which may be the same chamber used for welding the edges of the multiple glazed unit, an electric current is passed through the stripe to effect heating of the stripe and the glass immediately adjacent thereto. During heating of the stripe, both the top and bottom sheets of the multiple glazed unit are suitably supported by vacuum chucks. When the glass in the area of the stripe reaches softening temperature, the vacuum chuck supporting the top sheet of glass is moved upwardly relative to the bottom vacuum chuck to create an enlarged chamber in the unit. During this operation, the spacing of the glass sheets about the marginal edges of the unit, i.e., from the electrically conductive stripe to the welded edges of the unit, remains substantially unaffected, whereas the spacing of the glass sheets throughout the remainder of the unit is uniformly increased a desired amount. The unit is held in this position for a time sufficient to allow the heat-softened glass to drop below softening temperature, and the unit is thereafter transferred to a suitable lehr oven for annealing and cooling. After annealing and cooling, the unit is purged with dry air or an insulating gas and hermetically sealed.

As will be apparent upon reference to FIGS. 1 and 2, the unit produced by the process of this invention comprises a top sheet 10 and a bottom sheet 12 fused or welded together about their marginal edges, as shown at 14, and generally having a stepped edge configuration produced by reason of the spacing X of the glass sheets about the peripheral marginal edges of the unit being less than the spacing Y of the glass sheets throughout the remainder of the unit. As will be appreciated, the spacing X, plus the thickness of the glass sheets 10 and 12, remains substantially unchanged during processing from a conventional welded unit to a double-spaced unit. Accordingly, the double-spaced unit of this invention is still adapted to fit standard glazing sash produced for conventional welded units. However, the increased spacing Y of the glass sheets 10 and 12 in the double-spaced unit of this invention provides greatly enhanced thermal insulating properties over the conventional welded unit due to the increased hermetically sealed air space enclosed therebetween.

While the present invention has been described with reference to the specific details of a preferred embodiment, it is not intended that such details should be regarded as limitations upon the scope of the invention, except insofar as included in the accompanying claims.

What is claimed is:

1. A process for manufacturing double-spaced multiple glazed units comprising providing a multiple glazed unit having a pair of glass sheets fused together about their marginal edges, applying a continuous electrically conductive stripe to one glass sheet inwardly of the fused edges thereof, conducting a current through said stripe to effect heating of the stripe and the glass immediately adjacent thereto, said glass reaching a temperature of at least its softening point but below its melting point, moving the portion of said one glass sheet circumscribed by said stripe relative to the other glass sheet and thereafter cooling said heated portion of said one glass sheet.

2. The process of claim 1 wherein the electrically conductive stripe is applied to said one glass sheet about ½ inch to 1 inch in from the fused edges thereof.

3. The process of claim 2 wherein said electrically conductive stripe comprises colloidal graphite.

4. The process of claim 2 wherein said multiple glazed unit is preheated prior to conducting said current through said stripe.

5. A process for manufacturing double-spaced multiple glazed units comprising providing a multiple glazed unit having a pair of glass sheets fused together about their marginal edges, supporting each of said glass sheets of said multiple glazed unit, heating a circumscribing marginal portion of one glass sheet inwardly of the fused edges thereof, said glass reaching a temperature of at least its softening point but below its melting point, moving the portion of said one glass sheet within said heated circumscribing marginal portion thereof relative to the other glass sheet and thereafter cooling said heated portion of said one glass sheet.

6. The process of claim 5 wherein the multiple glazed unit is preheated prior to said heating of a circumscribing marginal portion of one glass sheet thereof.

7. The process of claim 6 wherein a continuous electrically conductive stripe is applied to said one glass sheet inwardly of the fused edges thereof.

8. The process of claim 7 wherein said heating of a circumscribing marginal portion of said one glass sheet is accomplished by conducting a current through said electrically conductive stripe to effect heating of the stripe and the glass immediately adjacent thereto.

9. The process of claim 8 wherein the electrically conductive stripe comprises colloidal graphite.

10. The process of claim 9 wherein the electrically conductive stripe is applied to said one glass sheet about ½ inch to 1 inch in from the fused edges thereof.

References Cited

UNITED STATES PATENTS 2,624,979    1/1953    Clever et al. _____ _____ 65—58X

S. LEON BASHORE, Primary Examiner

S. R. FRIEDMAN, Assistant Examiner

U.S. Cl. X.R.

65—102; 156—292